United States Patent [19]

Tank

[11] Patent Number: 4,880,154

[45] Date of Patent: Nov. 14, 1989

[54] BRAZING

[76] Inventor: Klaus Tank, 9 Warbleton Avenue, Essexwold, Bedfordview, Transvaal, South Africa

[21] Appl. No.: 34,218

[22] Filed: Apr. 1, 1987

[30] Foreign Application Priority Data

Apr. 3, 1986 [ZA] South Africa .................... 86/2471

[51] Int. Cl.$^4$ ............................................. B23K 31/04
[52] U.S. Cl. ................................... 228/122; 228/121; 228/103; 228/263.12
[58] Field of Search ............... 228/103, 120, 121, 122, 228/233, 238, 242, 263.12; 219/85 A

[56] References Cited

U.S. PATENT DOCUMENTS

| | | | |
|---|---|---|---|
| 3,453,719 | 7/1969 | Feenstra | 228/122 |
| 4,107,506 | 8/1978 | Pelegri | 219/85 A |
| 4,156,329 | 5/1979 | Daniels et al. | 175/330 |
| 4,228,942 | 10/1980 | Dietrich | 228/121 |
| 4,610,934 | 9/1986 | Boecker et al. | 228/263.12 |

FOREIGN PATENT DOCUMENTS

| | | |
|---|---|---|
| 0104063 | 8/1986 | European Pat. Off. . |
| 1259681 | 1/1968 | Fed. Rep. of Germany . |
| 1489130 | 10/1977 | United Kingdom . |

*Primary Examiner*—Richard K. Seidel
*Attorney, Agent, or Firm*—Scully, Scott, Murphy & Presser

[57] ABSTRACT

In the brazing of a component which comprises a carbide substrate carrying a layer of PCD (polycrystalline diamond) to a steel body, appropriately shaped brazing shims are placed between mating surfaces which are to be brazed. The component is forced towards the steel body and the steel body is heated uniformly across its surface where brazing is to take place. This is achieved by means of an induction heater placed adjacent the steel body at a position remote from that surface of the steel body where brazing is to take place. The local temperature at the PCD layer is monitored continuously and the heating process controlled so that this local temperature does not exceed 750°. After brazing, the component and steel body are permitted to cool down slowly to ambient temperature.

4 Claims, 3 Drawing Sheets

BRAZING

BACKGROUND TO THE INVENTION

THIS invention relates to brazing, and in particular to the brazing of PCD (polycrystalline diamond)—containing components to steel.

SNYDRILL is a trade mark used by the applicant for its range of cutters which have a thin layer of PCD sintered to a tungsten carbide substrate. The SYNDRILL cutters have been widely accepted for use on bits for the petroleum industry and in other drilling operations when the rocks which are encountered are soft or are of medium hardness. Recently developed drag bits employ far larger SYNDRILL cutters than was previously the case, and the problem has arisen of brazing the cutters to their steel backings in a manner leading to sufficient shear strength to withstand the imposed shear forces during operation.

The heart of the problem resides in the fact that the PCD layer will only remain stable for any appreciable period of time at temperatures less than 750° C. This makes torch brazing a less desirable method of brazing because of the high localised temperatures. Also, experiments conducted using conventional furnace brazing techniques have proved to be unsatisfactory because of the high furnace temperatures and long retention times which are required for adequate shear strengths in the brazed connection, the end result being a reduction in abrasion resistance, and possibly even cracking, of the PCD layer.

SUMMARY OF THE INVENTION

The invention provides a method of securing a component which comprises a carbide substrate carrying a layer of PCD to a steel body by brazing, wherein brazing takes place either directly between mating surfaces of the substrate and the steel body or between mating surfaces of the substrate, an intermediate carbide element and the steel body, the method including the following steps:

(1) interposing appropriately shaped brazing shims between the mating surfaces which are to be brazed,
(2) applying force to the component to urge it towards the steel body,
(3) heating the steel body to a uniform temperature across the extent of its mating surface at which brazing is to take place, heating of the steel body being achieved with the use of an inductor located adjacent the steel body at a position remote from the mating surface of the steel body at which brazing is to take place;
(4) continuously monitoring the local temperature at the PCD layer of the component;
(5) controlling the heating of the steel body so that the local temperature at the PCD layer does not exceed 750° C.; and
(6) after brazing has taken place between the substrate and the steel body, or between the substrate, the intermediate carbide element and the steel body, as the case may be, allowing slow cooling to ambient temperature to take place.

Preferred steps in the method include the following:
(a) Grinding or otherwise treating the surfaces which are to be brazed so that the surface texture of those surfaces is between 0.4 and 1.6 μm Ra (maximum);
(b) cleaning the surfaces which are to be brazed, firstly by steelblasting and then using absolute alcohol;
(c) plating the surfaces which are to be brazed with nickel, copper or gold and, if necessary, treating the plated surfaces to effect alloying;
(d) applying brazing flux to all brazing joints which are exposed to atmosphere, but not to non-exposed surfaces which are to be brazed;
(e) controlling the heating of the steel body so that the temperature at the PCD layer does not exceed 730°.

One important application of the invention is in the secural of large SYNDRILL cutters to steel blades which are subsequently welded to a steel drag bit to form diametrically opposed cutter wings on the bit.

SPECIFIC DESCRIPTION

Figure 1:
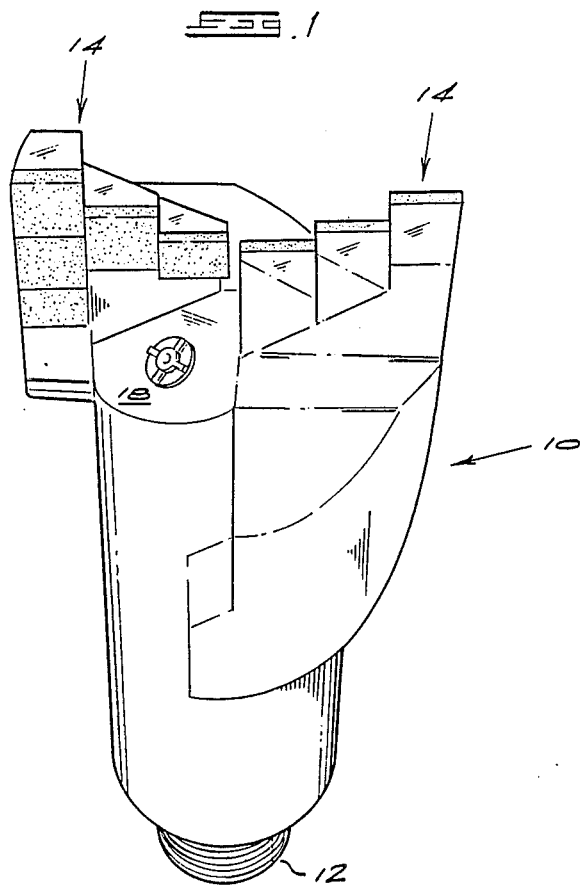
FIG. 1 shows a perspective view of a drag bit which includes SYNDRILL cutters, the tungsten carbide substrates of which are brazed directly to steel blades which are in turn welded into the bit in a two-wing configuration.
Figure 2:
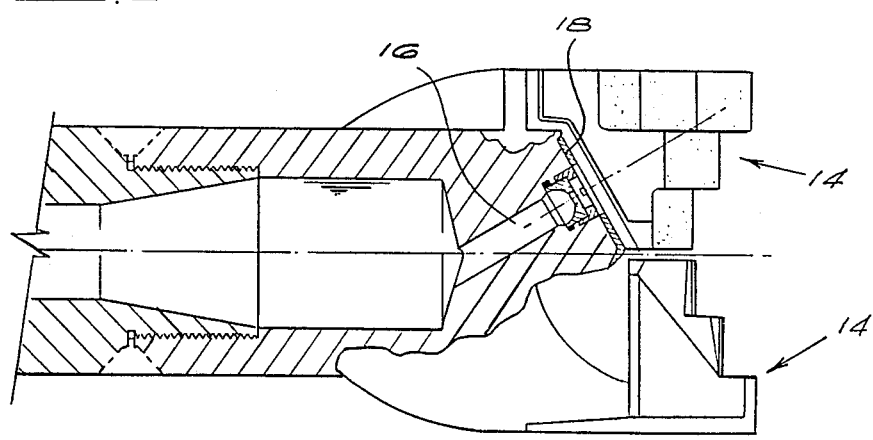
FIG. 2 shows a cross-sectional view through the bit of FIG. 1.

Referring to FIG. 1, a steel drill bit which is used for soft rock or rock of medium hardness is indicated with the reference numeral 10. The bit carries a threaded pin 12 at one end, and diametrically opposed cutter wings 14 at the other end. Flushing passages 16 (only one visible in FIGS. 1 and 2) extend to chamfered surfaces 18 which are diametrically opposed to one another and which are located between the wings 14.

Figure 3:
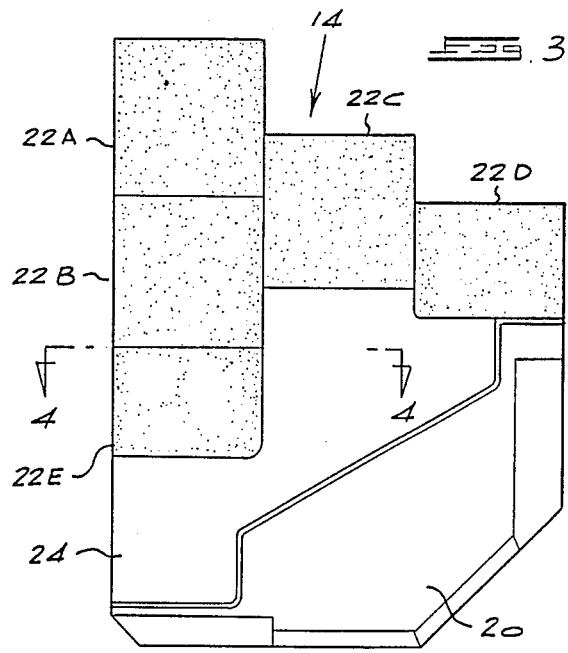
FIG. 3 shows a detail of one of the wings of the bit.

The cutter wings 14 are of stepped configuration. As shown in FIG. 3, each wing has a steel blade 20 onto which a series of SYNDRILL cutters 22 are brazed. The cutters 22A to 22C are generally square in shape with a side of approximately 35 mm, while the remaining cutters 22D and 22E are oblong. It will be appreciated that these cutters are considerably larger than are the stud cutters used in conventional stud-type drill bits.

Each wing 14 also has brazed to it a tungsten carbide element 24 shaped as shown in FIG. 3. The wings 14 are welded into complementarily shaped pockets formed in the body of the bit 10.

In operation of the drag bit illustrated in FIG. 1, it is rotated about its axis and forced axially into the rock which is to be drilled. Drilling takes place purely by a shearing action rather than by the combined effects of shearing and attrition as is the case with conventional bits used stud cutters. The bit tends to centralise itself in the drilled hole because of the stepped configuration of the wings. Also, because of the large spaces which exist between the wings on opposite sides of the bit, there is free movement of flushing liquid or air which is introduced through the passages 16 to remove drilling debris.

Figure 4:
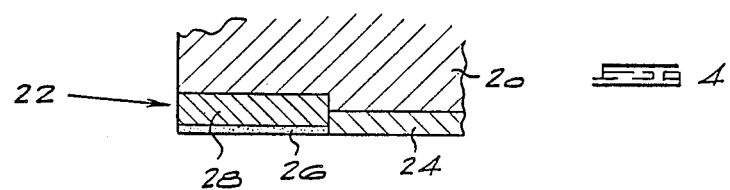
FIG. 4 shows a section at the line 4—4 in FIG. 3.

The present invention is primarily concerned with the secural of the SYNDRILL cutters to the steel blades. As shown in FIG. 4, each SYNDRILL cutter 22 has a thin PCD layer 26 on its leading surface which is carried by a tungsten carbide substrate 28. The substrate 28 is, in this case, brazed directly to the steel blade 20. The tungsten carbide element 24, which provides the otherwise exposed face of the blade 20 with abrasion resistance during drilling, is also brazed directly to the steel blade alongside the cutter 22.

Figure 5:
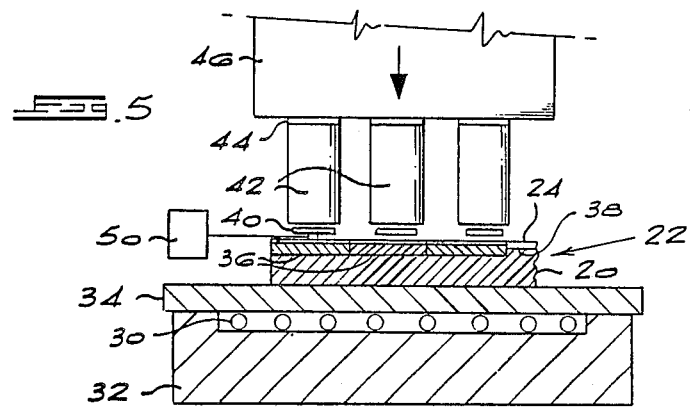
FIG. 5 shows a schematic view of apparatus used in the method of the invention.

FIG. 5 illustrates the apparatus which is used to effect brazing of the cutters 22 and the element 24 to the steel blade 20. The apparatus includes a flat spiral induction coil 30 which is arranged horizontally in a holder 32 immediately beneath a slab 34 of insulating asbestos. The steel blade 20 is laid flat on the asbestos slab 34 with its cutters 22 and element 24 positioned in recesses 36 and 38 formed in the steel blade. Insulating asbestos pads 40 are laid on top of the PCD layers 26 of the cutters 22 and upstanding steel cylinders 42 are placed on the pads.

Small rubber pads 44 are positioned atop the steel cylinders 42 and support a horizontal loading beam 46 on which extra weights can be located. The weights which are added to the beam urge the cutters 22 and element 24 towards the steel blade 20, with the pads 44 serving to equalise the loading between the cutters and element so that equal loads are applied to each.

EXAMPLE 1

Using the apparatus described with reference to FIG. 5, the cutters 22 and element 24 were brazed to the steel blade 20 using the following procedure.

The mating surfaces of the cutters 22, the element 24 and the blade 20 were ground and machined to have a surface texture between 0.4 and 1.6 $\mu$m Ra (maximum). The steel blade was electroless neckel-plated and was subsequently heat-treated at 930° C. for one hour in an argon atmosphere after the grinding and machining operation.

The mating surfaces were then thoroughly cleaned by steelblasting with a medium steel grit (BSS grade G12 or SAE grade G50), and cleaned with absolute alcohol before being wiped dry with a clean paper towel.

A 0.2 mm thick Degussa 5009 braze shim containing 50% Ag, 15.5% Cu, 15.5% Zn, 16% Cd and 3% Ni was cut to shape so as to extend over the area on th steel blade occupied by the cutters 22 and the element 24 with a 2 mm overlap. The braze shim was then wiped and cleaned with alcohol and all oxidation marks, including fingerprints, were removed with fine waterpaper.

The steel blade, the braze shim, the SYNDRILL cutters and the element 24 were assembled to the configuration seen in FIG. 5.

The steel blade was then laid horizontally on an asbestos slab beneath which was arranged an H.F. spiral wound induction coil in its holder. The induction machine supplying the induction coil had a capacity of 50 Kw and 33 KHz. Pads of multi-layer asbestos about 3.2 mm thick were placed on th PCD layers of the cutters 22. The cutters 22 were then downwardly loaded by placing steel cylinders on top of the asbestos paper pads, arranging a horizontal loading beam over the rubber pads at the upper ends of the cylinders, and positioning weights on the beam. The loading which was used was 25 to 40 g/mm$^2$.

Figure 6:
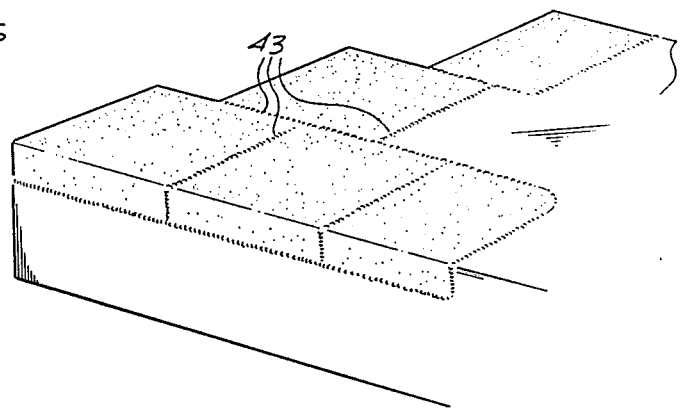
FIG. 6 shows how brazing flux is applied to exposed brazing joints.

Degussa "Special H" flux was then applied to all brazing joints which were exposed to the atmosphere, including all butting joints. FIG. 6 illustrates the zones 43 in which the "Special H" flux was applied. No flux at all was applied to the unexposed areas of the surfaces which were to be brazed.

A thermocouple 50 was arranged between a PCD layer of a cutter 22 and its associated asbestos paper pad to monitor the local temperature at the PCD layer.

The induction coil was energised and heat was allowed to soak slowly through the steel blade to achieve a uniform temperature across the surface of the steel blade which was to be brazed. The temperature registered by the thermocouple was continuously monitored and the operation of the induction coil was periodically terminated to maintain the temperature at the PCD layer at 730° C. This was achieved with a heating cycle of approximately 10 seconds on and 10 seconds off. The temperature was maintained at this level for 10 minutes, whereafter the induction machine was switched off and the apparatus allowed to cool slowly in air. Then the temperature at the PCD layer had dropped to 500° C., the loading on the cutters was removed and cooling in air was allowed to continue to ambient level.

The assembled and brazed cutter wing was removed from the apparatus and residue flux and oxidation deposits were removed with a fine steelblast.

A bit of the kind illustrated in FIG. 1 was assembled using wings brazed in accordance with the procedure set out above and were subjected to shear tests. With an axial load of approximately 25 000 kilograms, the bit was found to be capable of withstanding a shear stress of approximately 207 MPa before failing.

EXAMPLE 2

In another example, the steel blade was not plated with nickel but the remaining steps in the brazing procedure were the same as those described above. In this case, with an axial load of approximately 23 260 kilograms, a shear stress of 193 MPa was achieved at failure.

Figure 7:
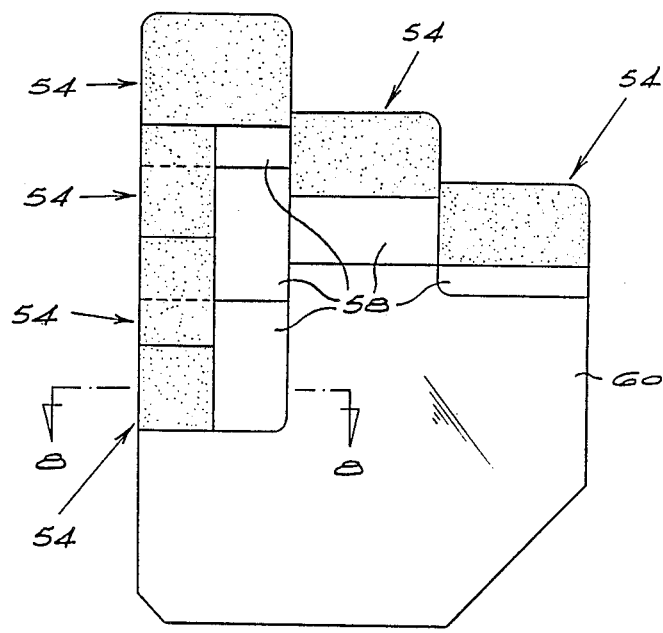
FIGS. 7 and 8 show an alternative wings for use in drill bits, FIG. 8 showing a cross section at the line 8—8 in FIG. 7.
Figure 8:
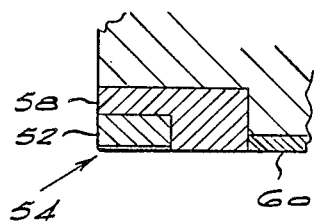

FIGS. 7 and 8 illustrate an alternative form of cutter wing which can also be assembled and brazed using the aforegoing technique. In this case, the carbide substrates 52 of the SYNDRILL cutter elements 54 are not brazed directly to the steel blade 56. Instead, intermediate tungsten carbide inserts 58 are positioned between the carbide substrates 52 and the steel blade, as shown in FIG. 8. There is also a further tungsten carbide element 60 which corresponds to the element 24 of the FIG. 1 embodiment. The advantage of the tungsten carbide insert 58 is that the stresses resulting from differential thermal expansion between the SYNDRILL cutters and the steel blade are reduced when compared to the stresses which result when direct brazing between the carbide substrate and the steel blade takes place. Of course in the arrangement of FIGS. 7 and 8, braze shims are used at each interface where brazing is to take place.

I claim:

1. A method of manufacturing a generally flat cutter wing for a drag bit which has two or more cutter wings disposed generally radially at the leading end of the bit, the wing having a stepped configuration and comprising a plurality of generally flat cutters secured by brazing to a generally flat steel body, each cutter being composed of a PCD layer on a carbide substrate, wherein the brazing takes place either directly between mating surfaces of the carbide substrates and the steel body or between mating surfaces of the carbide substrates, intermediate carbide elements and the steel body, and wherein the method comprises the following steps:

(a) locating the cutters in recesses in the steel body with brazing shims interposed between the mating surfaces which are to be brazed to one another to form a generally flat cutter wing structure;

(b) applying external force to the cutters in a direction transverse to the flat structure to urge the cutters towards the steel body;

(c) heating the steel body to a uniform temperature across the extent of its mating surface at which brazing is to take place, such heating taking place inductively and by means of an induction coil located adjacent a surface of the steel body which is remote from the mating surface at which brazing is to take place;

(d) continuously monitoring the local temperature of the PCD layer during heating;

(e) controlling the energization of the induction coil so that said local temperature does not exceed the temperature at which the PCD layer suffers temperature degradation; and (f) after the brazing shims have melted against the mating surfaces which are to be brazed, de-energizing the induction coil and permitting the flat cutter wing structure to cool slowly to ambient temperature.

2. A method according to claim 1 wherein the cutters have generally flat, rectangular shapes, at least some of such cutters having a side length of 35 mm or more.

3. A method according to claim 1 wherein said local temperature is controlled to be no more than 750° C.

4. A method according to claim 3 wherein said local temperature is controlled to be about 730° C.

* * * * *